(12) United States Patent  
Burton

(10) Patent No.: US 8,927,085 B2
(45) Date of Patent: Jan. 6, 2015

(54) CROSS LAMINATED STRAND PRODUCT

(75) Inventor: Peter Edward Burton, Keppel Sands (AU)

(73) Assignee: Lignor Limited., Melbourne, Victoria (AU)

( * ) Notice: Subject to any disclaimer, the term of this patent is extended or adjusted under 35 U.S.C. 154(b) by 450 days.

(21) Appl. No.: 13/116,383

(22) Filed: May 26, 2011

(65) Prior Publication Data

US 2011/0291441 A1 Dec. 1, 2011

(30) Foreign Application Priority Data

May 31, 2010 (AU) ................................ 2010902371

(51) Int. Cl.
*B62D 25/20* (2006.01)
*B32B 38/10* (2006.01)
*B32B 38/18* (2006.01)
*B27N 3/00* (2006.01)
*B27N 3/04* (2006.01)
*B32B 5/12* (2006.01)
*B32B 7/04* (2006.01)
*B32B 37/12* (2006.01)

(52) U.S. Cl.
CPC .............. *B32B 38/1808* (2013.01); *B27N 3/00* (2013.01); *B27N 3/04* (2013.01); *B32B 5/12* (2013.01); *B32B 7/04* (2013.01); *B32B 37/12* (2013.01); *B32B 2317/16* (2013.01); *B32B 2471/00* (2013.01)

USPC ........... 428/106; 428/105; 428/107; 428/109; 428/114

(58) Field of Classification Search
CPC .............. B27N 3/00; B32B 5/12; B32B 7/04; B32B 37/12; B32B 38/1808
USPC .......................... 428/105, 106, 107, 109, 114
See application file for complete search history.

(56) References Cited

U.S. PATENT DOCUMENTS

| 1,465,383 | A | * | 8/1923 | Walsh et al. ................... 428/106 |
| 4,361,612 | A | | 11/1982 | Shaner et al. |
| 5,506,026 | A | * | 4/1996 | Iwata et al. .................... 428/107 |
| 5,525,394 | A | | 6/1996 | Clarke et al. |
| 6,129,871 | A | | 10/2000 | Suzuki et al. |
| 2009/0181209 | A1 | | 7/2009 | Zheng et al. |

FOREIGN PATENT DOCUMENTS

WO 2005/070667 A1 8/2005

* cited by examiner

*Primary Examiner* — Brent O'Hern
(74) *Attorney, Agent, or Firm* — Ladas & Parry LLP

(57) ABSTRACT

A cross laminated strand product formed from a laminate of a plurality of layers, wherein each layer includes substantially aligned strands of wood bonded together with a binder including an isocyanate resin, and wherein the respective strands of adjacent layers are oriented substantially perpendicularly to one another.

38 Claims, 9 Drawing Sheets

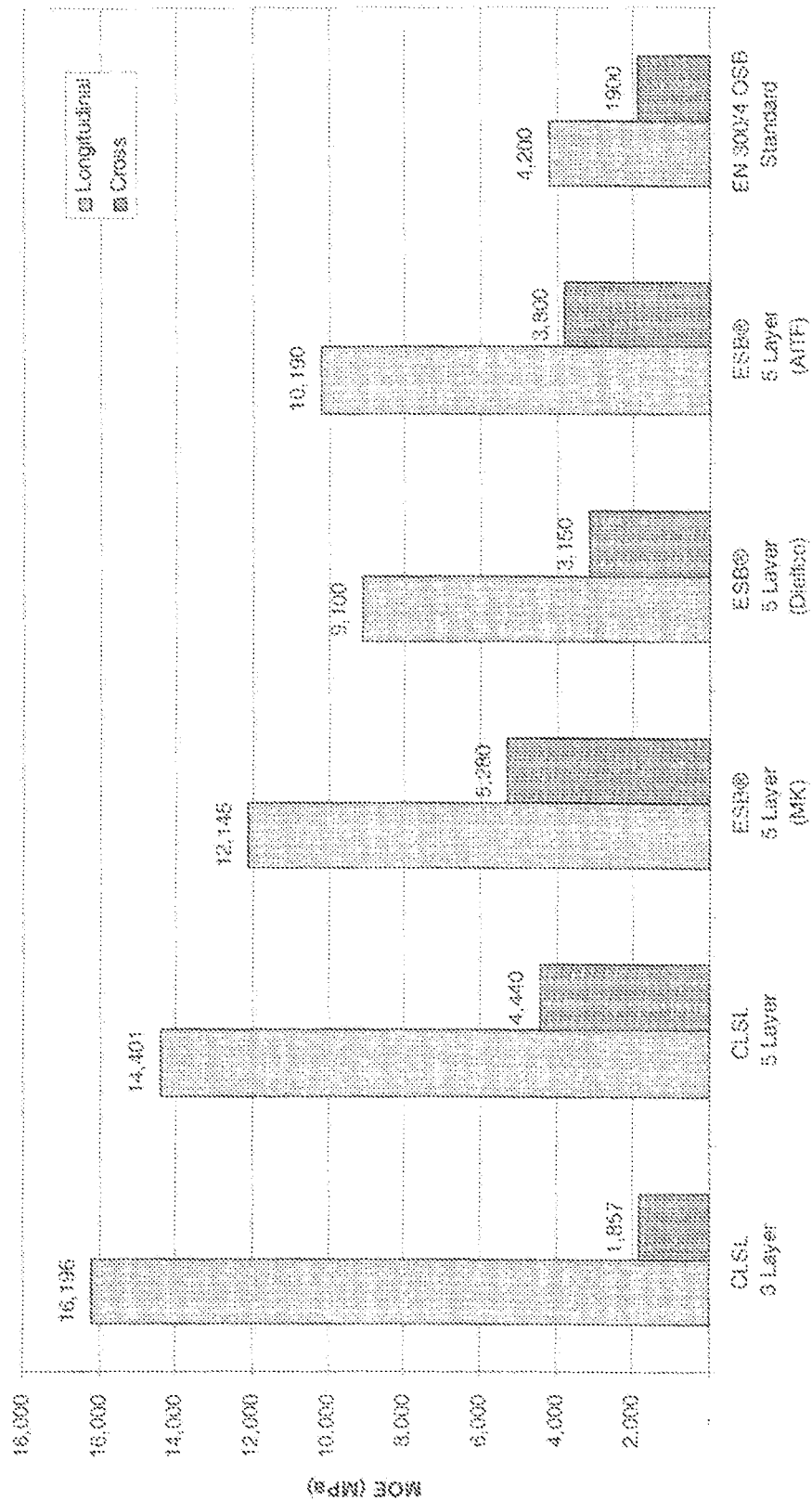

CROSS LAMINATED STRAND PRODUCT

BACKGROUND OF THE INVENTION

The present invention relates to a cross laminated strand product and a method for manufacturing a cross laminated strand product.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

A number of engineered wood products are known for use in a wide range of applications. As sources of high quality solid wood have declined due to high demand, engineered wood products have been developed which allow lower quality or renewable wood sources to be beneficially used. In many applications, engineered wood products are now preferred over solid wood due to comparative advantages over solid wood products such as lower cost and increased control of quality and performance properties.

Over the years, different types of engineered wood products have been developed, each with their own unique combinations of advantages and deficiencies. Of particular interest to structural applications are two groups of engineered wood products, namely those formed from wood veneers, such as plywood and laminated veneer lumber (LVL), and those formed from wood strands, such as oriented strand board (OSB) and oriented strand lumber (OSL).

Wood veneers are formed by peeling long sheets of wood from logs. The logs used to make wood veneers are generally higher quality logs sourced from older trees.

LVL is manufactured as a laminate of veneers oriented so that the grain direction of each layer is aligned, to provide a lumber product with high performance characteristics in the grain direction, making it suitable for spanning applications.

Plywood is manufactured in a similar fashion, but with the veneers oriented such that the grain direction of each layer is perpendicular to that of adjacent layers, resulting in a board product having good performance characteristics in both the longitudinal and lateral directions, suitable for flooring or panelling applications.

Although wood veneer products such as those described above have a number of desirable characteristics, the availability of good quality peeling logs is dwindling, and the once-common use of old growth forests to supply the wood veneer industry has been of increasing environmental concern.

Other laminated wood products such as glued laminated timber (Glulam) and cross laminated to timber (CLT) have also been used to obtain large composite structural beams and panels using solid wood sourced of smaller dimensions, enabling the use of logs with lower diameters. However, these products rely on high quality solid wood and thus suffer economic and sustainability problems similar to those suffered by veneer products.

Wood strand products have seen increased use, particularly in North America, and have become a lower cost alternative to wood veneer products in a number of structural applications. Wood strands are formed by cutting elongated, thin flakes of wood from logs which can be of lower quality and sourced from renewable plantation resources. By stranding the logs, any faults in the wood are distributed homogeneously through the final product rather than staying intact as a potential failure point.

Strand products are typically formed by coating the strands with a binder, depositing the strands into a mat, and then heating and pressing the mat to cure the binder. Orientation of the strands as they are deposited into the mat will generally improve the performance qualities in the orientation direction. Continuous manufacturing processes are typically used, with the forming processes occurring sequentially as the product moves through the manufacturing plant along a conveyor belt, or the like.

Strand lumber products can be manufactured by orienting the strands of the mat in a single direction, to produce a product with high single directional performance similar to LVL. The strands are typically oriented length-wise in the continuous direction of the conveyor belt, and high degrees of alignment can be typically attained using mechanical processes.

In the case of OSB, boards are manufactured such that the mats have layers of strands with different orientations. Typical OSB products have outer layers with strands oriented length-wise and a core layer with strands oriented randomly, or cross-wise. These layers are built up as part of the mat forming process by sequentially depositing layers of strands with different orientations, with the thickness of the layers typically controlled by the weight of the mat at stages of the mat forming process.

However, the control of the layer thickness is not particularly reliable, and therefore these types of products often include substantial variations in the layer thicknesses. As a result, the layers are often poorly defined, and this can lead to increased variability in the resultant material properties in each direction.

A further issue is that the degree of alignment of the cross-oriented strands is typically poorer than the length-oriented strands, which can lead to reduced cross-wise material properties. This is generally due to the different techniques for depositing strands oriented length-wise compared to strands oriented cross-wise in continuous board manufacturing plants. In the case of length-oriented strands, the strands are deposited using disc formers which can achieve very good degrees of alignment. On the other hand, the cross-oriented strands are deposited using fin formers which achieve relatively lower degrees of alignment.

Along with building construction, another significant market for engineered wood products is to provide floor coverings for shipping containers, and the like. Containers are predominantly provided with coverings of plywood board 25 mm to 30 mm thick. Although wood flooring is relatively expensive, it has substantial advantages over other materials, in that it is strong and resilient, does not dent, may be easily replaced during repairs, and allows cargo to be fastened to the flooring. However, the source of veneers for plywood used in container flooring is typically old growth tropical hardwood trees. This is an unsustainable practice which is decimating tropical forests, and therefore the use of alternative products using sustainable wood resources is desirable.

U.S. Pat. No. 4,361,612 discloses a lamina for a medium density structural board made from dimensioned wood flakes cut from a mixture of hardwood species. The wood flakes are blended with a phenol formaldehyde resin having a major quantity of a low molecular weight fraction and a wax and then formed into a hot pressed product. The lamina may be used alone or as the core of a structural board having veneer, hardboard or plywood face panels. Three or more lamina may be formed into a structural board or used as the core of a board having veneer, hardboard or plywood face panels.

U.S. Pat. No. 5,525,394 discloses an OSB product comprised of a baseboard having three wood strand layers, the wood strands being oriented in space with respect to a board-forming machine to such that a core layer is comprised of wood strands oriented generally in a random or cross-machine direction and each adjacent layer is comprised of coarse and fine wood strands oriented generally in the machine direction and wherein the wood strands comprising each adjacent layer are formed with the coarsest strands located nearest the core layer and the finest strands are located nearest the outer surfaces of each outer board layer. The OSB board product is clad with a dry felted wood fiber overlay on one planar surface of the baseboard.

U.S. Pat. No. 6,129,871 discloses a method for producing a wood board comprising the steps of shaving lumber to produce wooden strands; applying a binder to the wooden strands; subjecting the binder coated wooden strands to a forming process to form a preformed material; and carrying out a steam injection pressing in which the preformed material is subjected to thermal compression molding while being moisturized.

WO 2005/070667 discloses a hard wood strand lumber or board product including substantially aligned strands of one or more eucalypts bonded together with an isocyanate resin.

US 2009/0181209 discloses reinforced composite container flooring with resin-impregnated veneers, a core layer which may be formed from a structural strand-based panel or a multi-layer wood veneer panel, and its manufacturing processes.

SUMMARY OF THE PRESENT INVENTION

The present invention seeks to substantially overcome, or at least ameliorate, one or more of the disadvantages of existing arrangements.

In a first broad form the present invention provides a cross laminated strand product formed from a laminate of a plurality of layers, wherein each layer includes substantially aligned strands of wood bonded together with a binder including an isocyanate resin, and wherein the respective strands of adjacent layers are oriented substantially perpendicularly to one another.

Typically each layer is pre-formed.

Typically each layer includes one or more pre-formed boards including substantially aligned strands of wood.

Typically each layer has substantially equal thickness.

Typically each layer has a thickness of between 5 mm and 50 mm.

Typically the strands are formed from hardwood.

Typically the strands are formed from wood of one or more eucalypts.

Typically the eucalypts are selected from the species selected from the group consisting of:
a) Tasmanian Bluegum (*E. Globulus*);
b) Karri (*E. Diversicolor*);
c) Sydney Bluegum (*E. Saligna*);
d) Marri (*E. Calophylla*);
e) Jarrah (*E. Marginata*); and,
f) Shining Gum (*E. Nitens*).
g) Flooded Gum (*E. Grandis*)

Typically the strands are formed from plantation trees having an age of 12 years or less.

Typically the strands are formed from forest thinnings having an age of 30 years or less.

Typically the strands are formed from softwood.

Typically the strands are formed from wood of pines.

Typically the binder includes a polymeric methane di-isocyanate resin.

Typically the binder includes a wax.

Typically the strands have an average length of between 145 mm and 300 mm.

Typically the strands have an average width of between 10 mm and 25 mm.

Typically the strands have an average thickness of between 0.5 mm and 1.5 mm.

Typically at least 85% of the strands of each layer are aligned.

Typically at least 95% of the strands of each layer are aligned.

Typically the product has a density of between 600 kg/m$^3$ and 850 kg/m$^3$.

Typically the product includes an odd number of layers, so that outside layers of the product are substantially aligned in the same direction.

Typically the outside layers are substantially aligned in a length direction of the product.

Typically surfaces of each layer are substantially flat.

Typically the surfaces of each layer are sanded flat.

Typically at least one surface of each layer is glued to a surface of an adjacent layer to form the laminate.

Typically the layers are glued together using a Poly Urethane Reactive (PUR) glue.

Typically the cross laminated strand product is used as industrial flooring in at least one of the following:
a) trucks; and,
b) containers.

Typically the product includes 5 layers.

In a second broad form the present invention provides industrial flooring including a cross laminated strand product formed from a laminate of a plurality of layers, wherein each layer includes substantially aligned strands of wood bonded together with a binder including an isocyanate resin, and wherein the respective strands of adjacent layers are oriented substantially perpendicularly to one another.

Typically the strands have been treated for insects.

In a third broad form the present invention provides a method of manufacturing a wood strand product, the method including:
a) forming a plurality of layers, each layer including substantially aligned strands of wood bonded together with a binder including an isocyanate resin;
b) forming a laminate of the plurality of layers, wherein the respective strands of adjacent layers are oriented substantially perpendicularly to one another.

Typically the method includes pre-forming the layers.

Typically the method includes forming the layers from one or more pre-formed boards including substantially aligned strands of wood.

Typically the method includes forming the boards using a continuous strand board forming technique.

Typically the method includes forming the strands from hardwood.

Typically the method includes forming the strands from logs of eucalypts.

Typically the logs are harvested from plantation trees having an age of 12 years or less.

Typically the logs are harvested from forest thinnings having an age of 30 years or less.

Typically the method includes forming the strands from softwood.

Typically the method includes forming the strands from logs of pines.

Typically the method includes treating the strands for insects.

Typically the method includes sanding the surfaces of each layer.

Typically the method includes gluing one surface of each layer to a surface of an adjacent layer to form the laminate.

Typically the method includes gluing the layers together using a Poly Urethane Reactive (PUR) glue.

Typically the method includes forming the product from 5 layers.

BRIEF DESCRIPTION OF THE DRAWINGS

An example of the present invention will now be described with reference to the accompanying drawings, in which: —

FIG. 5A is a graph showing comparative modulus of elasticity performance for cross laminated strand products and conventional strand products;

DETAILED DESCRIPTION OF THE PREFERRED EMBODIMENTS

Figure 1A:
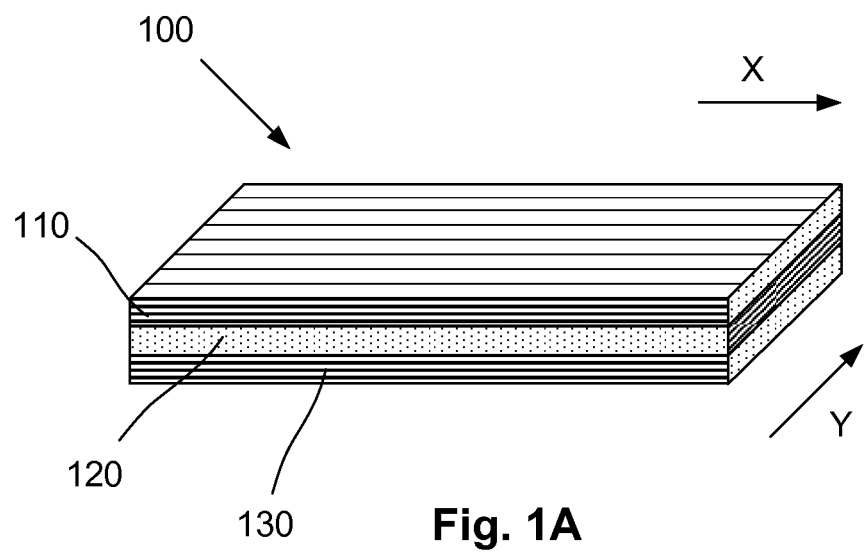
FIG. 1A is a schematic perspective view of a first example of a cross laminated strand product.
Figure 1B:
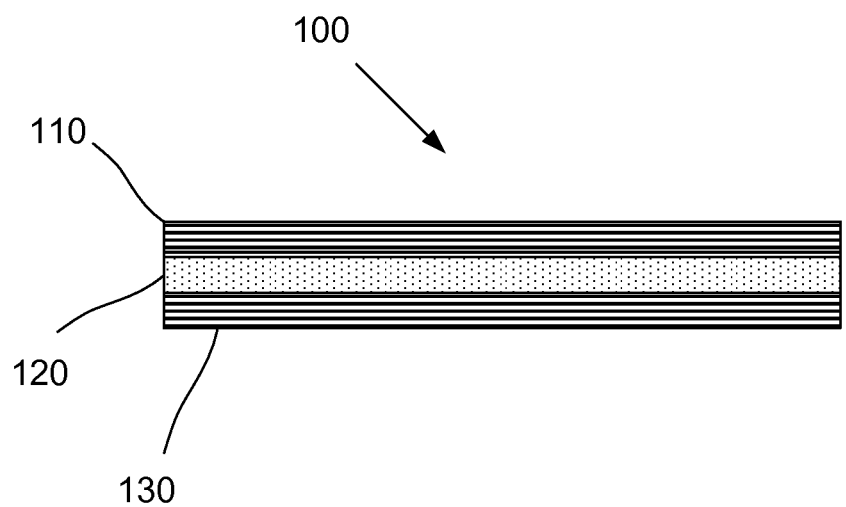
FIG. 1B is a schematic end view of the cross laminated strand product shown in FIG. 1A.

A first example of a cross laminated strand product will now be described with reference to FIG. 1A and FIG. 1B.

The cross laminated strand product 100 is manufactured from a laminate of a plurality of layers. Each layer includes substantially aligned strands of wood bonded together with a binder including an isocyanate resin. The respective strands of adjacent layers are oriented substantially perpendicularly to one another.

Each of the layers of the cross laminated strand product 100 has strands substantially aligned in a single direction, and adjacent layers are distinguished from one another by the particular orientation direction of the strands in that layer.

In one example of a rectangular cross laminated strand product, having an elongated length dimension and a shorter width dimension, the orientation direction of layers alternates between a direction parallel to the length dimension of the cross laminated strand product ("length-wise") and a direction parallel to a width dimension of the cross laminated strand product ("cross-wise").

By forming a laminate of pre-formed layers with strands oriented in alternating directions, a cross laminated strand product 100 can be formed with layers having controlled thicknesses and well-defined interfaces between their respective surfaces, and a good degree of alignment of strands in each direction. As the layers are laminated with layers alternating between length-wise and cross-wise, this manufacturing process can be described as "cross laminating", hence the use of the term "cross laminated" strand product.

The cross laminated strand product 100 is suitable for use as a board or lumber product, depending on the dimensions in which the product is supplied. For example, cross laminated strand products may be referred to as "cross laminated strand board" when provided with relatively small total thicknesses and as "cross laminated strand lumber" when provided with relatively large total thicknesses.

A skilled person will understand that the cross laminated strand product 100 described above helps to overcome one or more of the deficiencies of conventional strand products, such as OSB products.

For example, the cross laminated strand product 100 helps to mitigate the relatively poor definition and control of layers which can be problematic in the manufacture of conventional strand products, in which the strands are deposited in layers across the thickness of the board by merely changing the orientation of the strands deposited throughout the mat formation process. Variations in the layer thicknesses and poor definition of the layer boundaries result in variations in the resulting material properties in each direction. In order to account for these variations, minimum performance ratings for conventional strand products must be reduced to account for the worst-case layer configurations, or quality control measures must be taken to reject conventional strand products failing to meet set criteria.

In contrast, the cross laminated strand product 100 can be provided with well defined layers such that the layer configurations are more tightly controlled. The variations in the layer configurations are greatly reduced, and as a result, cross laminated strand products 100 as described above can be manufactured with higher performance ratings, and/or fewer rejects. Each layer can be pre-formed using the same forming process so that the layers have consistent thickness and surface properties. Further details of how the layers are formed will be provided below.

Furthermore, the cross laminated strand product 100 helps to mitigate the relatively low degree of alignment in the cross-wise direction which is typically found in conventional strand products. The manufacture of conventional strand products typically utilizes a continuous process where the products are formed sequentially along a conveyor belt. Current continuous strand product manufacturing processes typically allow for high alignment in the direction of travel of the conveyor belt, but relatively lower alignment across the conveyor belt. As a result, conventional strand products have traditionally delivered relatively low performance in the cross-wise direction.

In contrast, the strand orientation direction of the layers of the cross laminated strand product 100 is controlled by the arrangement of the layers in the laminate, and not by the alignment of strands as they are deposited in layers during mat formation. Each of the layers of the cross laminated strand product 100 can be provided by one or more pre-formed boards, where each board is formed from a mat with strands substantially aligned in the direction of travel the conveyor belt across the entire board thickness. These pre-formed boards can be cross laminated to form the cross laminated strand product 100 so that a good degree of alignment is achieved for each layer.

It will be appreciated that the cross laminated strand product 100 also offers some of the benefits of plywood, such as well controlled layer properties, without requiring high quality peeling logs for the production of veneers. Faults in veneer sheets and resulting reduction in performance is a common problem in the production of plywood, however the cross laminated strand product 100 avoids this, as any faults in the wood are distributed homogeneously through the layers due to the use of strands in the layers. Accordingly, the cross laminated strand product 100 is suitable as a sustainable alternative to plywood in numerous applications.

Specific comparisons of the performance of the cross laminated strand product to common engineered wood products will be discussed in further detail below.

Referring again to FIG. 1A and FIG. 1B, the example cross laminated strand product 100 includes three layers, namely a top layer 110, a core layer 120, and a bottom layer 130. The strands of the top layer 110 and bottom layer 130 are substantially aligned length-wise, in the direction indicated by the arrow labelled X. On the other hand, the strands of the core layer 120 are substantially aligned cross-wise, in the direction indicated by the arrow labelled Y, such that the alignment of the strands in the core layer is perpendicular to the alignment of the strands in the adjacent top layer 110 and bottom layer 120.

Although the cross laminated strand product 100 in this example includes three layers, it will be appreciated that any number of layers can be used. However, an odd number of layers is typically used, so that the two outer layers have the same alignment, usually in the length-wise direction. This arrangement helps to improve the length-wise performance characteristics of the cross laminated strand product in the alignment direction of the outer layers, which is desirable for structural applications. In particular, by providing aligned outer layers, the length-wise bending performance is improved.

The use of an odd number of layers also means that the layers can be symmetrically arranged about a central core layer, with increased number of layers being added as intermediate layers between the core and surface layers.

The use of a number of layers greater than three, such as five or seven layers, helps to improve the cross-wise performance characteristics of the cross laminated strand product. For example, improved cross-wise tensile performance can be achieved because cross sectional area of the cross-wise layers as a proportion of the total cross sectional area of the cross to laminated strand product 100 increases as the number of layers increases. Furthermore, by providing additional cross-wise layers with greater separation from the centre plane, the cross-wise bending performance is improved. It will also be understood that cross laminated strand lumber suitable for structural use in building construction can be provided by the selecting the number of layers, and the layer thicknesses to deliver the required strength.

Figure 2:
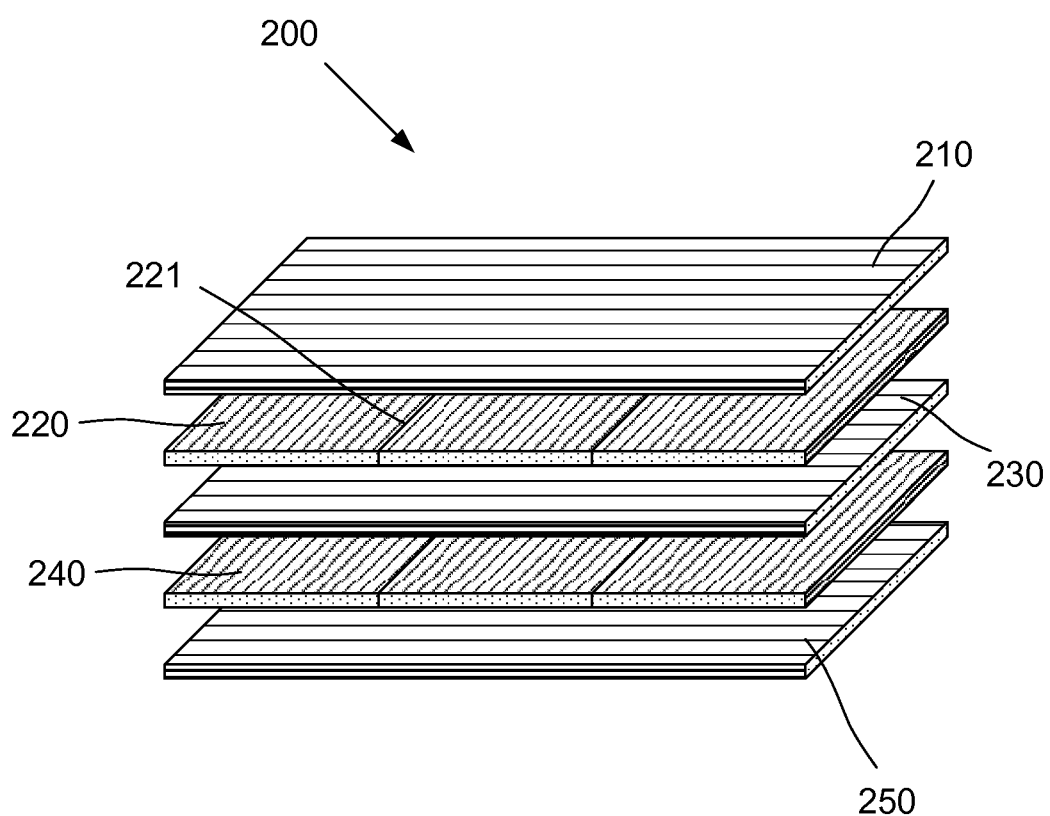
FIG. 2 is a schematic exploded perspective view of a second example of a cross laminated strand product.

An example of a five layer cross laminated board product 200 is shown in exploded view in FIG. 2, in order to illustrate the layer configuration in more detail. In this example, the top layer 210, bottom layer 250 and core layer 230 each have length-wise alignment, whilst the upper and lower intermediate layers 220, 240 have cross-wise alignment.

The length-wise alignment of the top layer 210 and bottom layer 250 allows the outer layers of the strand product 200 to be provided by single boards without requiring joints. For example, the boards used to form each layer can be manufactured in a continuous process, so that the lengths of the boards are only constrained by the length handling capacity of the board manufacturing plant. Accordingly, elongated cross laminated strand products with dimensions substantially equal to the largest board dimensions can be provided without any joints in the length-wise layers, such that no external joints are visible.

In this example, the cross laminated strand product 200 has a total length that is greater than the maximum board width, which is often the case. In this case, a number of boards are used to form each of the cross-wise layers 220, 240, with internal edges of the cross-wise boards glued together at joints 221 using the same adhesive as used to bond the layers. Simple butt-joints provide suitable joints, although the skilled person will appreciate that various commonly used wood joinery techniques can be used, such as finger joints and chamfer joints, for example. In any event, the joints 221 will not have a substantial impact on the performance of the strand product, as the tensile strength of the joints will not be relied upon to transmit loads in the strand alignment direction in each layer.

In one example, the layers have substantially equal thicknesses. In this case, each of the layers are cut from boards manufactured using the same manufacturing technique, irrespective of the orientation of the layer in the laminate. However, it will be appreciated that cross laminated strand products can be provided with varying layer thicknesses. For example, by varying the thicknesses of the individual layers, it is possible to adjust the performance of the cross laminated strand product, such as strength, in any direction.

The thickness of each layer is determined by the process used to manufacture the board for the layers.

The minimum layer thickness used in cross laminated strand products will typically be limited by the economic viability of manufacturing thinner boards, as strand board manufacturing processes will typically become uneconomical for boards thinner than a particular thickness. In one example, the minimum board thickness is about 5 mm.

On the other hand, the maximum layer thickness may be limited by the capacity of the pressing technology implemented in the manufacturing plant. For example, the maximum board thickness manufactured using typical continuous hot press technology is about 50 mm. The use of pre-heating in advance of the press can allow thicknesses up to about 70 mm. The production of board thicknesses greater than about 70 mm using continuous press technology can be problematic due to pre-curing of the isocyanate resin. Boards with thicknesses ranging from about 100 mm to about 140 mm may be manufactured using steam press technology, although the use of continuous hot press technology is preferred for its superior throughput.

In one example, the boards are manufactured using similar manufacturing plants as used for conventional strand products, such as OSB. Therefore, the individual boards used to make up the layers of the cross laminated strand product can be manufactured with thicknesses up to the maximum thickness of conventional strand products. The total thickness of the cross laminated strand product will be dependent on the number of layers and the layer thicknesses. This means that the total thickness of cross laminated strand products are not limited by the board pressing technology, and therefore greater total thicknesses can be achieved than the thicknesses of OSB products and the like, because the total thickness can be increased by adding layers.

Figure 3:
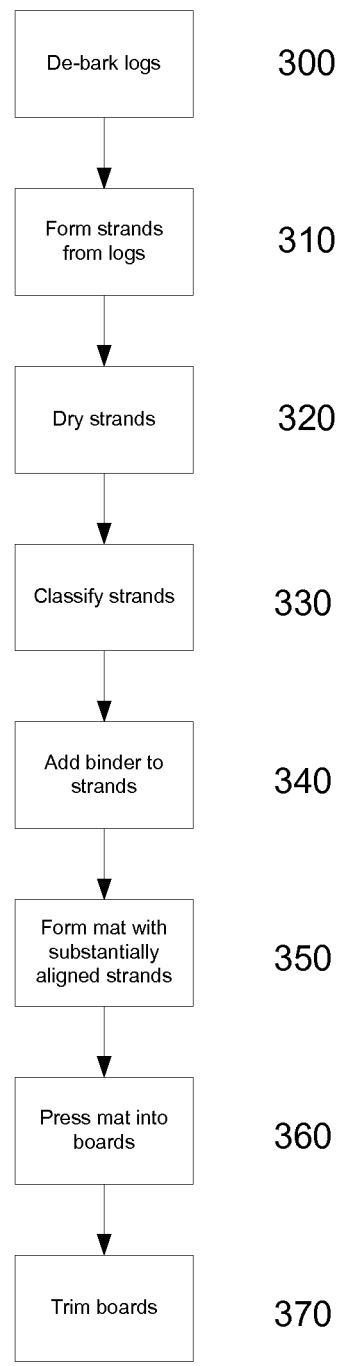
FIG. 3 is a flow diagram of the process for manufacturing strand boards for use in a cross laminated strand product.

An example of a process used to manufacture the boards of each layer will now be described with reference to FIG. 3. The process outlined here is based on the Siempelkamp CONTIROLL system and is given by way of example only. It will be appreciated that the layers can be manufactured using a variety of processes for manufacturing strand products.

The process begins with harvested logs. The source of logs is not particularly limited, but it will be appreciated that the final properties of the resulting cross laminated strand product will be affected by the choice of wood. In one example, the strands are formed from hardwood, such as trees from one or more eucalypt species. Eucalypt plantations provide a sustainable hardwood source, and strand products formed from eucalypts have been found to offer desirable performance properties.

Examples of suitable eucalypt species include Bluegum (*E. Globulus*), Karri (*E. Diversicolor*), Sydney Bluegum (*E. Saligna*), Marri (*E. Calophylla*), Jarrah (*E. Marginata*) and Shining Gum (*E. Nitens*).

In the case of plantation trees such as Bluegum (*E. Globulus*), Sydney Bluegum (*E. Saligna*) and Shining Gum (*E. Nitens*), the strands can be formed from trees having an age of 12 years or less, with diameters of around 150 to 300 mm. In the case of forest thinnings such as Karri (*E. Diversicolor*), Marri (*E. Calophylla*) or Jarrah (*E. Marginata*) the strands can be formed from trees having an age of less than 30 years and with diameters less than 400 mm Single species may be used in a particular product or multiple species may be combined.

In another example, the strands are formed from softwood, such as trees from pine, cedar, fir or yew species. In particular, pine plantations are a well established renewable wood resource capable of providing high yields of trees suitable for stranding.

It is also possible to use strands formed from more than one species. For example, the strands of different layers may be formed from wood from different species. In another example, strands of different species may be mixed in the same layer. By combining multiple species of wood in the layers to produce a "hybrid" product, the properties of the cross laminated strand product 100 can be controlled based on the particular combination of species.

At step 300 the logs are debarked before passing through a strander to form strands from the logs at step 310. A ring strander is typically used to cut logs of fixed or random length into strands of a specified length, width and thickness. The strands are preferably formed with a length of about 145 mm to 300 mm, a width of about 10 to 25 mm and a thickness of about 0.5 to 1.5 mm.

The strands are dried at step 320 to preferably less than 5% moisture and are then classified in sieves at step 330 according to product specifications. A strand holding bin holds the dried and classified strands until required.

Waste bark or rejected strands and fines can provide the fuel for a heat plant that generates heat for the drier and other parts of the process. About 70% of the original logs can be used to form product. Most of the remaining 30% can be used in the heat plant.

At step 340 a binder is added to the strands. Typically, this involves conveying the strands on demand to a resin blender in which resin and wax are added in required proportions, typically about 6 to 10% of dry matter and 2% of dry matter respectively. The mixed strand, resin and wax is known as "furnish" and is typically held in a furnish holding bin.

The preferred resin is an isocyanate binder such as polymeric methane di-isocyanate (PMDI). The preferred wax is a paraffin emulsion such as MOBILCER available from Mobile Australia, or similar products available from Dynea and Oest. Other additives such as pesticides, fungicides and fire retardants can be added at this point and mixed to ensure uniform distribution throughout the finished product matrix.

At step 350, the furnish is supplied to a mat former where the strands are substantially aligned in the direction of the conveyor belt and deposited onto the conveyor belt to form a mat of the required mass. A combination of alignment and mass controls the mechanical properties of the mat produced. The strands are formed in substantially aligned or unidirectional arrangement. Typically, at least 85% of the strands are aligned; however, it is possible for greater than 95% of the strands to be aligned using modern disc formers to orient the strands.

The performance properties of the board in the alignment direction increase as the strand alignment increases, and therefore high strand alignments are preferable. Accordingly, in one example, at least 95% percent of the strands are substantially aligned. Measurements of the alignment of the strands in test products have shown that the mean angle of the strands from the intended alignment direction is 11.4 degrees.

In one example, the mat then passes a checking station which carries out weight, moisture and metal detection. Any rejected material is conveyed either as waste to the heat plant or set aside for special processing.

In any event, at step 360 the mats are pressed into boards. This may involve passing the mats through a preheating station prior to passing the mat through a continuous press. Typical continuous board manufacturing processes produces boards up to 2.7 m wide and 15 m long. In this example, the press heats the material to above 100° C. for at least 1 minute.

Following pressing, the boards are cooled and trimmed and at step 370.

The resulting boards have a substantially uniform density of between 600 kg/m$^3$ and 850 kg/m$^3$.

Up to this stage, the boards may be manufactured using common techniques for manufacturing strand boards.

Figure 4:
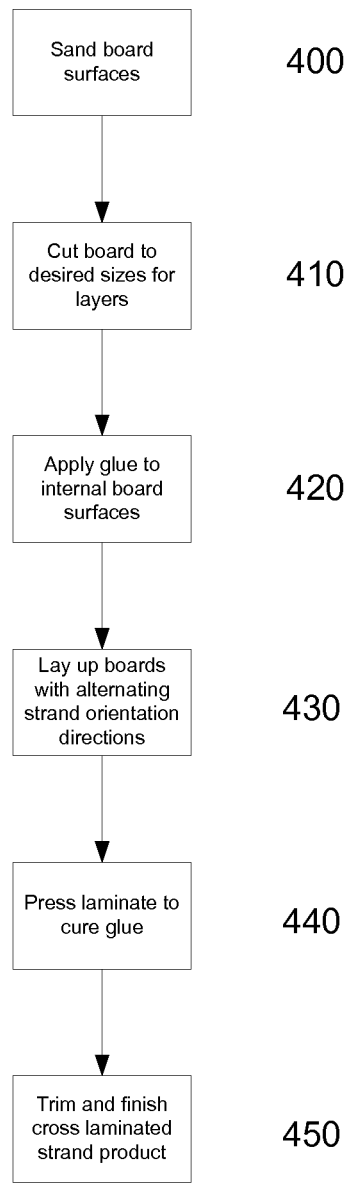
FIG. 4 is a flow diagram of the process for manufacturing a cross laminated strand product.

With the manufacture of the boards completed, the process of forming the laminate can commence, using one or more of the boards to form each of the layers. An example process for manufacturing the cross laminated strand product using the manufacture boards will now be described with reference to FIG. 4.

Preferably, the surfaces of the boards are substantially flat, in order to facilitate the lamination process. Accordingly, at step 400, the surfaces of the boards may be sanded or otherwise treated after their manufacture to attain a desired surface roughness.

Since the orientation of the layers alternates, the dimensions of boards used in the length-wise layers will be different to the dimensions of the boards used in the cross-wise layers, such that the length of the cross-wise layers are equal to the width of the length-wise layers. Accordingly, the boards are cut to the desired sizes for the layers at step 410.

As discussed above with reference to FIG. 2, it is possible to manufacture a cross laminated strand product having the same length and width of the board used to make up the layers. In one example, this allows a cross laminated strand product that is 2.4 m wide and 12 m long, which is equivalent to the board size that can be manufactured by a typical continuous press.

In one example of a strand product having three layers, the upper and lower layers can be boards of the full board dimensions, whilst boards to be used in the core layer can be cut to lengths equal to the width of the full board dimension, and arranged side-by side so that a number of boards span the length of the cross laminated strand product in the core layer.

It will be appreciated that cross laminated strand products of any dimension smaller than the manufactured board dimension can be produced in this manner, such that each of the upper and lower layers are made from a single board.

With the boards sanded and cut to size, the boards are then laid up, alternating between the length-wise and cross-wise boards, to form the laminate. The process of laying up the boards is similar to that used to manufacture plywood, but some different techniques are required given that the boards of each layer are substantially thicker than the veneers used in plywood.

As the boards are laid up, at least one surface of each layer is glued to a surface of an adjacent layer to form the laminate. In one example, the layer surfaces are glued together using Polyurethane Reactive (PUR) glue. However, it will be appreciated that numerous types of glues will be suitable, such as phenolic and formaldehyde based glues which are commonly used in plywood manufacture.

It will be appreciated that different processes for applying the glue to the layers during lay up of the laminate can be used, and varying levels of automation of these processes may be implemented.

In this example, glue is applied to the internal board surfaces at step 420 and the boards are progressively laid up with alternating strand orientation directions at step 430.

However, in another example, glue is applied to the upper surface of each board as each layer is added to the laminate, with the exception of the top layer. In another example, glue is applied to both the upper and lower surface of each cross-wise layer only, which will also result in each layer being glued together.

For thinner cross laminated strand boards with thicknesses up to 30 mm, such as those used in industrial flooring, the gluing and lay up processes may be automated. However, thicker cross laminated strand lumber products will typically require manual gluing and lay up processes.

Once the desired number of layers has been glued and laid up, the laminate is pressed and the glue is allowed to cure at step 440. The press can be heated or unheated, and the choice of pressing parameters such as pressure and duration will be subject to a number of factors the type of glue and wood being used, the board thickness and the number of layers.

The pressing system used to press the strand board layers in the laminate is similar to pressing systems commonly used in plywood manufacture.

The pressing and curing stage may result in some further compression of the final product such that the total thickness is less than the sum of the individual layers. In one example, a five layer cross laminated strand product formed from 6 mm thick boards results has a final thickness of 28 mm.

After the glue is cured, the cross laminated strand product is trimmed and finished at step 450. This can involve sanding the edges and treating the exterior of the cross laminated strand product as necessary to provide a finished cross laminated strand product with the desired dimensions and external properties.

Figure 5B:
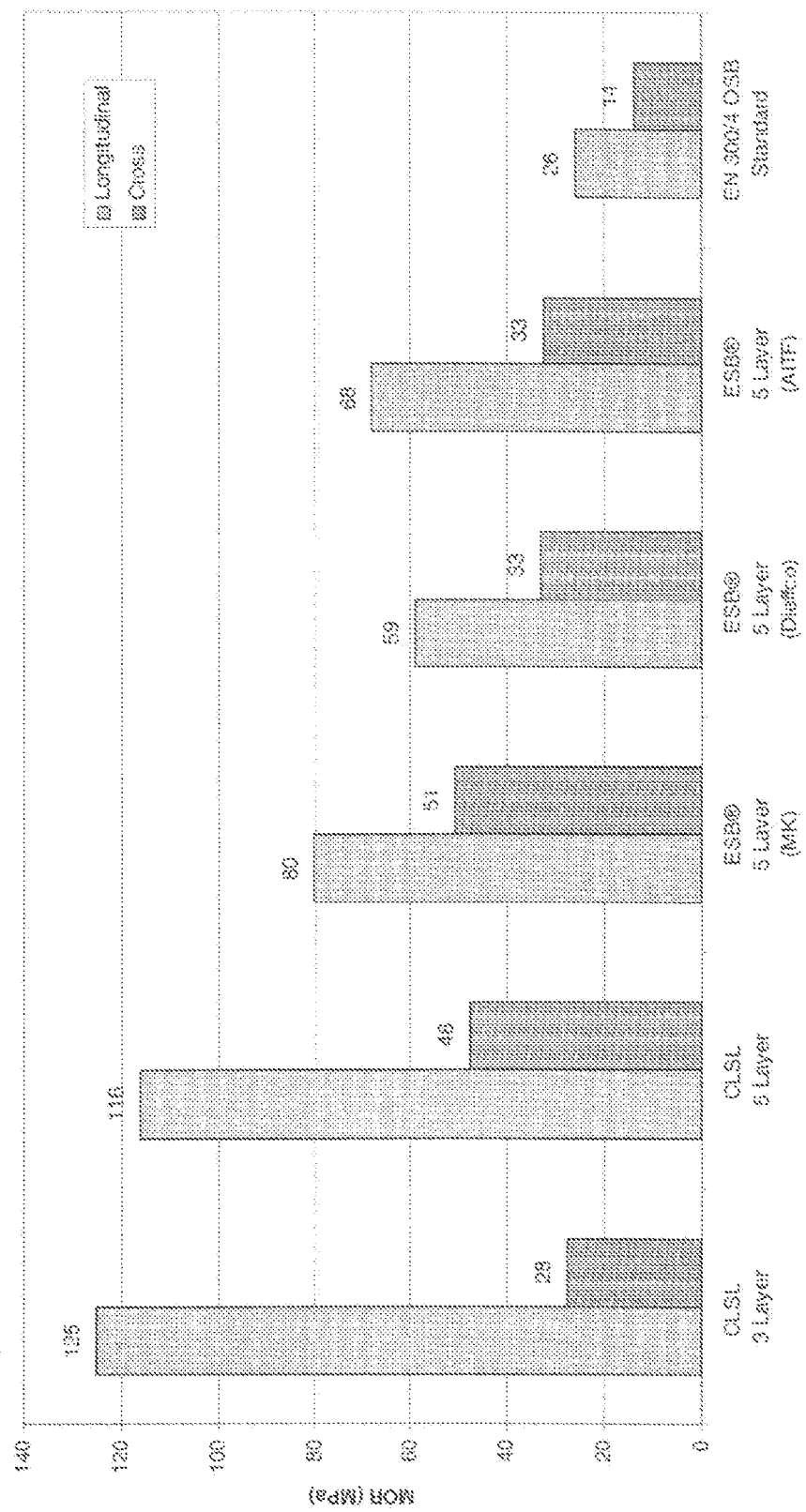
FIG. 5B is a graph showing comparative modulus of rupture performance for cross laminated strand products and conventional strand products.
Figure 5C:
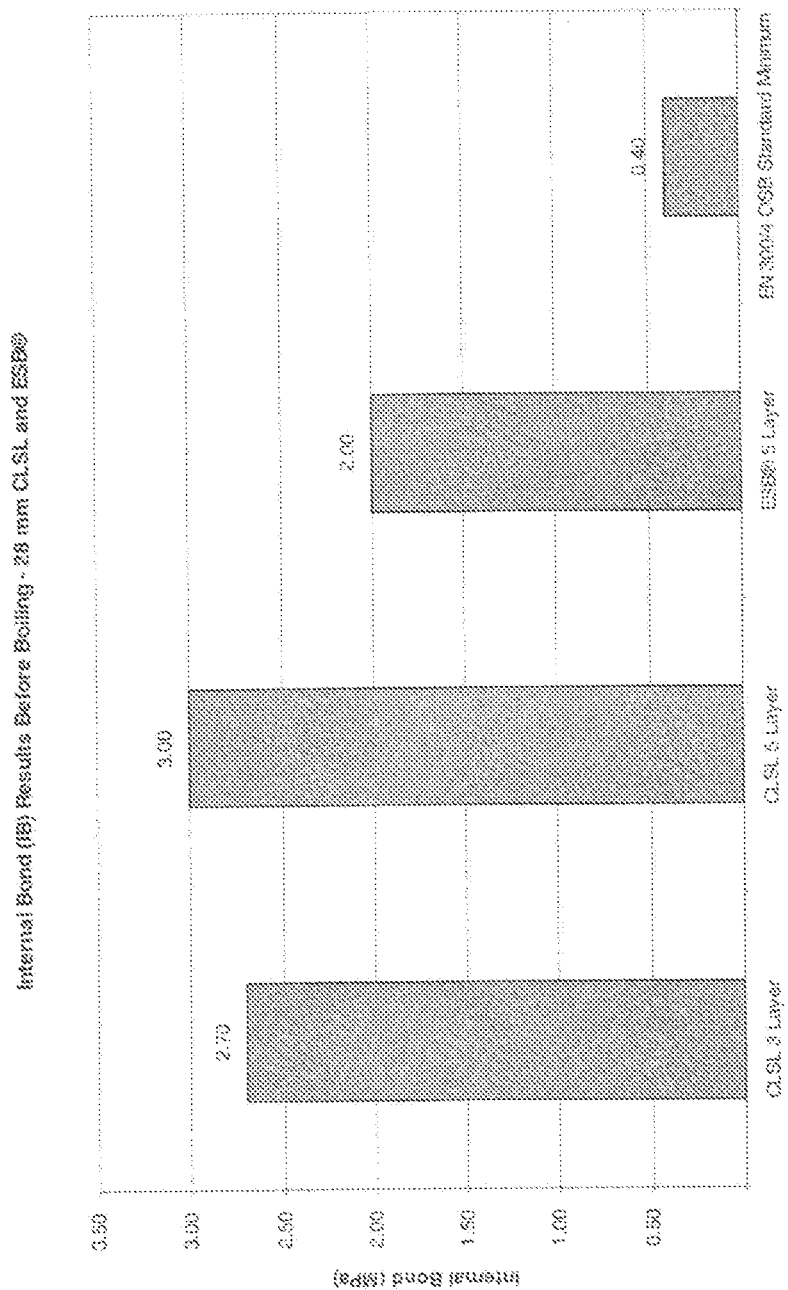
FIG. 5C is a graph showing comparative internal bond performance for cross laminated strand products and conventional strand products.

Performance properties of representative cross laminated strand products will now be outlined and contrasted with the performance of conventional strand products, with reference to FIGS. 5A to 5C. Note that the cross laminated strand products are labelled "CLSL" in all of the performance results described below, however it should be appreciated that the results presented are representative of the performance of cross laminated strand products in general, including cross laminated strand board (CLSB) and cross laminated strand lumber (CLSL) products.

FIG. 5A shows the modulus of elasticity performance results from testing in the longitudinal and cross directions of 28 mm cross laminated strand products and conventional strand products, whilst FIG. 5B shows the modulus of rupture performance results for the same products.

Specifically, the results are shown for a three layer cross laminated strand product ("CLSL 3 Layer") and a five layer cross laminated strand product ("CLSL 5 Layer"), in comparison with three variations of 5 layer strand board products formed using conventional techniques (i.e. layers formed by changing strand orientations during mat forming), and the performance required by the EN 300/4 standard for OSB products.

The cross laminated strand products and conventional strand board products have each been formed using strands from Bluegum (*E. Globulus*) trees and an isocyanate binder, and each product has the same thickness of 28 mm. The strands of the cross laminated strand products in these tests were formed with an average length of about 240 mm. The conventional strand products of this type are marketed as Engineered Strand Board (ESB).

The primary differences between the three different ESB products lies in the strand deposition method used to form the board. For example, the "MK" ESB is produced by aligning the strands in the length-wise oriented layers mechanically, and the strands in the cross-wise layers manually to form the mat, which results in a very high degree of alignment in the cross-wise layers. This is a highly labour intensive process and is generally uneconomical, but is illustrative of the optimal cross-wise alignment achievable in a conventional strand board. On the other hand, the "Dieffco" and "AITF" strand boards are produced by all mechanical processes which are representative of those typically used to manufacture conventional strand boards, including OSB. As discussed above, the mechanical alignment of strands in the cross-wise direction typically results in a lower degree of alignment in the cross-wise layers.

As can be seen in FIG. 5A, the three and five layer cross laminated strand products provide longitudinal modulus of elasticity performance results which greatly exceed the EN 300/4 requirements and offer substantial improvements over the conventional strand products formed from the same materials.

The three layer cross laminated strand product modulus of elasticity is slightly higher than that of the five layer product, and this is largely due to the higher proportion of the cross sectional area being longitudinally oriented in the three layer product.

Notably, the five layer cross laminated strand product has a higher longitudinal modulus of elasticity than the five layer conventional strand products. Although these products each have similar compositions, the cross laminated strand products deliver superior modulus of elasticity.

In general, the improved performance of the cross laminated strand products compared to the conventional strand products is due to the controlled nature of each lamina thickness and the elimination of density variations found in a multi layer mat.

Turning now to the cross-wise modulus of elasticity results, it can be seen that the five layer cross laminated strand product shows more than double the modulus of elasticity of the three layer product. This may be attributed to a higher proportion of the cross sectional area being aligned cross-wise, as the ratio of strands aligned in each direction is determined by the number of layers in each direction.

Furthermore, the optimized strand alignment in each layer of the cross laminated strand product results in improved cross-wise properties which are not possible with the mechanical cross formers used in the conventional strand boards with the mechanically formed cross layers. The "MK" ESB results, in which the strands of the cross-wise layers were laid by hand, directly illustrate the performance benefits of providing a high degree of strand alignment in the cross-wise layers, when compared to the using mechanical laying techniques as per the "Dieffco" and "AITF" ESB results.

It will be appreciated that the cross-wise modulus of elasticity of the five layer cross laminated strand product shows substantial improvement over that of the "Dieffco" and "AITF" conventional strand products formed with all mechanical strand alignment processes and approaches the performance of the manually oriented "MK" strand products. These results reflect the improved cross-wise degree of alignment of the cross laminated strand to board over the mechanically aligned cross-wise layers of conventional strand boards.

FIG. 5B shows trends for modulus of rupture that are generally similar to those observed for modulus of elasticity. Due to the similar strand compositions of the cross laminated strand products and conventional strand products, this is largely to be expected.

As in the modulus of elasticity results, the modulus of rupture results show that improved alignment of strands in the cross-wise direction, as in the cross laminated strand product and the "MSK" ESB, leads to improved results. However, the evenness of the layers in the cross laminated strand products results in peak modulus of rupture results that cannot be achieved with mechanical forming of all layers in a uniform manner as per the conventional strand boards. In addition, each of the layers of the cross laminated strand board is sanded for further optimized thickness prior to bonding, which also helps to improve the modulus of rupture performance.

FIG. 5C shows the results of internal bond testing of cross laminated strand boards compared to conventional strand boards. Internal bond strength is a measure of the strength of the bonding of the strands and layers across the thickness direction, or in other words it quantifies the resistance of the product to delamination. As shown in FIG. 5C, the internal bond strength of the cross laminated strand products and ESB greatly exceed the OSB standard. The cross laminated strand products also offer substantial improvements in internal bond strength over the ESB.

It is noteworthy that tests have shown the internal bond failure mode for the cross laminated strand products to be rupture of the wood across the thickness of the strands, rather than failure of the resin binding the strands, or the glue between the layers. This illustrates that the internal bond strength is not compromised by the adhesion between the strands or layers, but is limited by the properties of the wood itself.

Figure 6A:
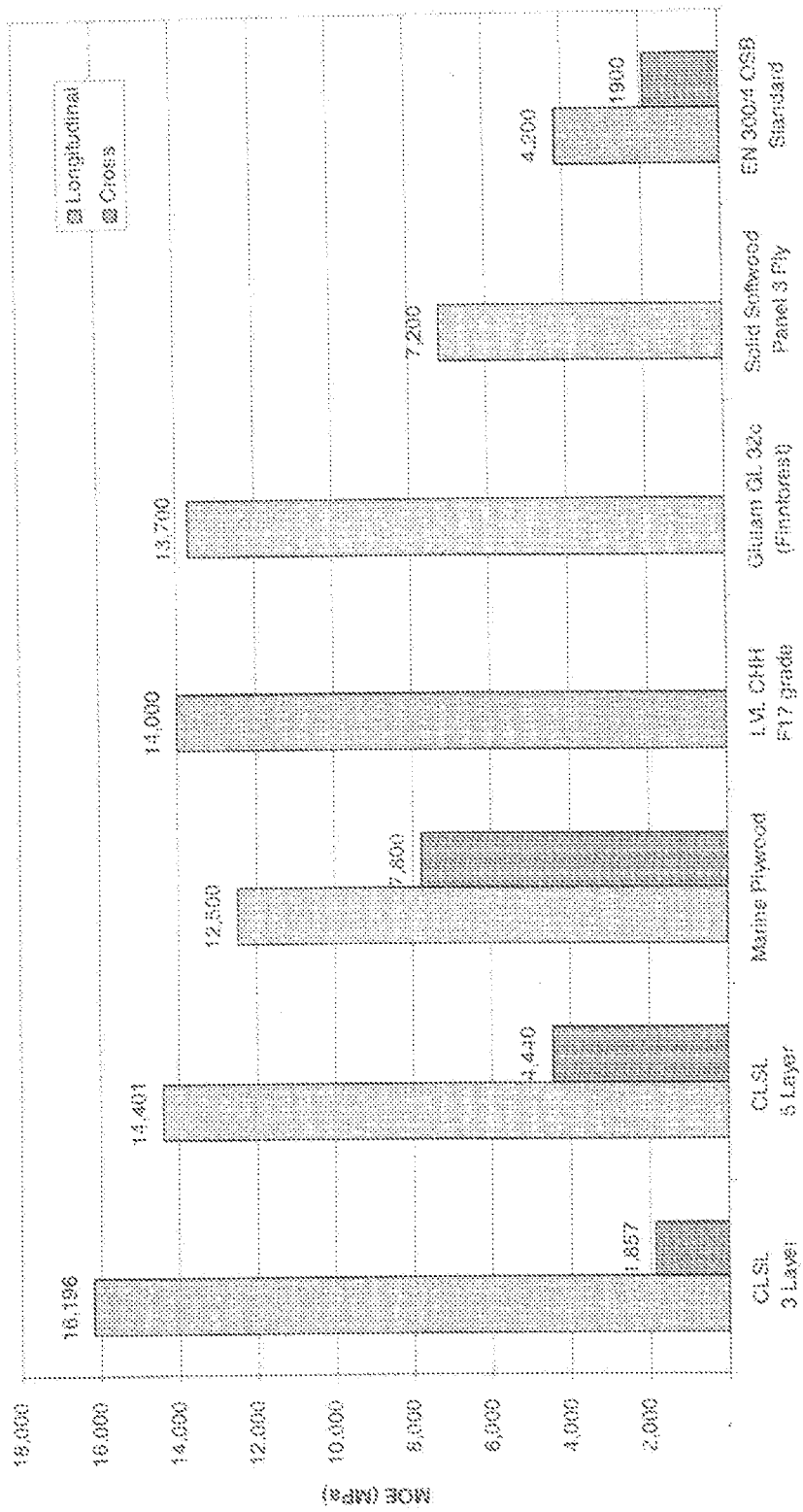
FIG. 6A is a graph showing comparative modulus of elasticity performance for cross laminated strand products and conventional engineered wood products; and, FIG. 6B is a graph showing comparative modulus of rupture performance for cross laminated strand products and conventional engineered wood products.
Figure 6B:
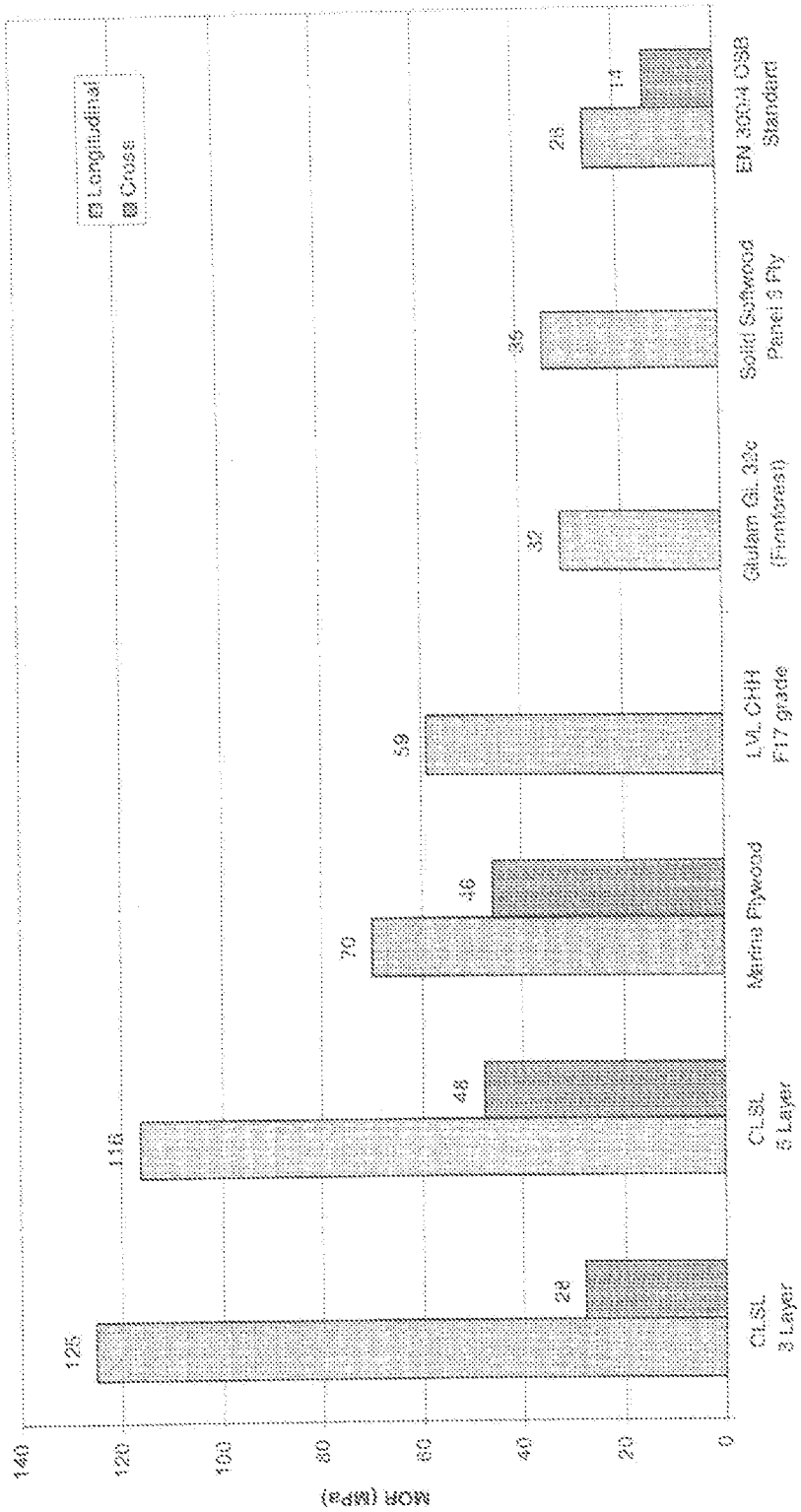

The performance of representative cross laminated strand products will now be contrasted with the performance of conventional engineered wood products, with reference to FIGS. 6A and 6B. It will be appreciated that the cross laminated strand product results of FIGS. 5A and 5B have been duplicated in FIGS. 6A and 6B, but in this case the results for representative examples of marine plywood, laminated veneer lumber (LVL), Glulam, and layered solid softwood panelling are shown for comparison, along with the OSB standard.

It should be noted that cross direction performance has not been shown for products which have a single grain direction, such as LVL, Glulam and the softwood panel. These products are specifically engineered for spanning applications and the like, where cross performance is of secondary consideration.

The comparative modulus of elasticity results will now be discussed with reference to FIG. 6A.

In comparison to marine plywood, the cross laminated strand products offer superior modulus of elasticity performance in the longitudinal direction. The performance in the cross direction is relatively lower for the cross laminated strand products. However, this difference in performance is mainly the result of the different amount of wood aligned in the cross direction in the plywood compared to the cross laminated strand board. For example, the 28 mm plywood has 19 veneers, of which 9 have their wood grain aligned in the cross direction, resulting in a thickness of 13.23 mm of wood aligned in the cross direction. In contrast, the three layer cross laminated strand product of the same thickness only has a thickness of 9.3 mm of strands aligned in the cross direction. The five layer cross laminated strand product increases the cross aligned thickness to 11.2 mm and it can be seen that this increase brings the modulus of elasticity performance closer to that of the plywood.

The cross laminated strand products offer longitudinal modulus of elasticity performance that is substantially equivalent to that of LVL and Glulam, which are each specifically engineered to maximise their longitudinal performance by aligning the grains of their layers in a single direction. The cross laminated strand products also offer superior performance in comparison to the solid softwood panel product.

The comparative modulus of rupture results will now be discussed with reference to FIG. 6B.

It is apparent that the cross laminated strand products offer substantial improvements in modulus of rupture performance in the longitudinal direction over the conventional to engineered wood products. Furthermore, it is noteworthy that the cross direction modulus of rupture of the five layer cross laminated strand product is equivalent to that of the marine plywood.

In this regard, the modulus of rupture performance for the cross laminated strand board relates to the inherent strength of the eucalypt strands when compared to the strength of the hardwood plywood species. Furthermore, the plywood veneers typically carry natural faults and these provide potential failure points in the plywood, whereas the strands in the cross laminated strand board distribute any faults evenly throughout the product.

It will be appreciated that the strong longitudinal performance of the cross laminated strand products makes them well suited to a variety of applications. The cross laminated strand products have been shown to outperform conventional engineered wood products having aligned grains, which are typically used in structural spanning applications, and thus provide a viable alternative to those products.

As has been demonstrated in the above discussed test results, the performance of the cross laminated strand product exceeds the standard performance levels of conventional strand products and compares favourably with high end structural plywood. Accordingly, the cross laminated strand product is suitable for a wide range of applications as a sustainable substitute for those conventional products. As such, the cross laminated strand product is also suitable for use in place of plywood in building panels and concrete formworks.

One particular application outside of the building construction industry, for which the cross laminated strand product is particularly suitable, is industrial flooring used in trucks and sea containers. Plywood panels formed from hardwood veneers sourced from old growth tropical forests are commonly used for their durability, as the flooring has to withstand the rigors of loading and unloading of containers by forklifts and the like. The used of a cross laminated strand product manufactured from renewable wood sources such as plantation eucalypts will therefore help to reduce the strain on the remaining hardwood forest reserves.

When used for sea container flooring, the cross laminated strand product will be manufactured in compliance with an appropriate standard. For example, the Institute of to International Container Lessors (IICL) Performance Standard for Plywood Floor Panels for International Freight Containers is typically used by the major container manufacturers. Although this standard specifically relates to plywood, cross laminated strand products meeting the performance requirements set out in the IICL standard will be suitable for replacing plywood products in container flooring applications.

An example cross laminated strand product configuration particularly for use as container flooring will be described. However, it will be appreciated that other configurations may also be used in container flooring applications.

In this example, the cross laminated strand product is 28 mm thick and formed from five layers. The layers are formed from boards with an initial thickness of 6 mm, such that some compression of the total thickness occurs in forming the laminate.

The boards are manufactured using strands from a eucalypt species and the binder is a polymeric methane di-isocyanate resin. The strands are treated to eliminate insects such as termites, as this is an important requirement for container flooring. In this example, the treatment is in accordance with Australian Quarantine and Inspections Service (AQIS) standards.

A continuous manufacturing process is used with a hot pressing stage. The strands are aligned in the conveyor belt direction during mat formation using disc formers, resulting in at least 95% of the strands being aligned. The surfaces of the boards are sanded in preparation for laminating.

The boards are glued together using a Poly Urethane Reactive (PUR) glue to form the layers of the cross laminated strand product.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A cross laminated strand product formed from a laminate of a plurality of layers, wherein each layer includes one or more pre-formed boards including substantially aligned strands of wood bonded together with a binder including an isocyanate resin, and wherein the respective strands of adjacent layers are oriented substantially perpendicularly to one another;
    wherein two or more of the layers each include a pre-formed board extending across both of a length and a width of the product;
    wherein one or more other layers include two or more parallel pre-formed boards each extending across the width of the product; and
    wherein the strands have an average length of between 145 mm and 300 mm; an average width of between 10 mm and 25 mm; and an average thickness of between 0.5 mm and 1.5 mm.

2. A product according to claim 1, wherein each layer has substantially equal thickness.

3. A product according to claim 1, wherein each layer has a thickness of between 5 mm and 50 mm.

4. A product according to claim 1, wherein the strands are formed from hardwood.

5. A product according to claim 4, wherein the strands are formed from wood of one or more eucalypts.

6. A product according to claim 5, wherein the eucalypts are selected from the species selected from the group consisting of:

a) Tasmanian Bluegum (*E. Globulus*);
b) Karri (*E. Diversicolor*);
c) Sydney Bluegum (*E. Saligna*);
d) Marri (*E. Calophylla*);
e) Jarrah (*E. Marginata*); and,
f) Shining Gum (*E. Nitens*); and,
g) Flooded Gum (*E. Grandis*).

7. A product according to claim 5, wherein the strands are formed from plantation trees having an age of 12 years or less.

8. A product according to claim 5, wherein the strands are formed from forest thinnings having an age of 30 years or less.

9. A product according to claim 1, wherein the strands are formed from softwood.

10. A product according to claim 9, wherein the strands are formed from wood of pines.

11. A product according to claim 1, wherein the binder includes a polymeric methane di-isocyanate resin.

12. A product according to claim 1, wherein the binder includes a wax.

13. A product according to claim 1, wherein at least 85% of the strands of each layer are aligned.

14. A product according to claim 1, wherein at least 95% of the strands of each layer are aligned.

15. A product according to claim 1, wherein the product has a density of between 600 kg/m.sup.3 and 850 kg/m.sup.3.

16. A product according to claim 1, wherein the product includes an odd number of layers, so that outside layers of the product are substantially aligned in the same direction.

17. A product according to claim 16, wherein the outside layers are substantially aligned in a length direction of the product.

18. A product according to claim 1, wherein surfaces of each layer are substantially flat.

19. A product according to claim 18, wherein the surfaces of each layer are sanded flat.

20. A product according to claim 1, wherein at least one surface of each layer is glued to a surface of an adjacent layer to form the laminate.

21. A product according to claim 1, wherein the layers are glued together using a Poly Urethane Reactive (PUR) glue.

22. A product according to claim 1, used as industrial flooring in at least one of the following:
    a) trucks; and,
    b) containers.

23. A product according to claim 1, wherein the product includes five layers.

24. Industrial flooring including a cross laminated strand product formed from a laminate of a plurality of layers, wherein each layer includes one or more pre-formed boards including substantially aligned strands of wood bonded together with a binder including an isocyanate resin, and wherein the respective strands of adjacent layers are oriented substantially perpendicularly to one another;
    wherein two or more of the layers each include a pre-formed board extending across both of a length and a width of the product;
    wherein one or more other layers include two or more parallel pre-formed boards each extending across the width of the product; and
    wherein the strands have an average length of between 145 mm and 300 mm; an average width of between 10 mm and 25 mm; and an average thickness of between 0.5 mm and 1.5 mm.

25. Industrial flooring according to claim 24, wherein the strands have been treated for insects.

26. A method of manufacturing a wood strand product, the method comprising:
- providing a cross laminated strand product by forming a laminate of a plurality of layers,
- wherein each layer includes one or more pre-formed boards including substantially aligned strands of wood bonded together with a binder including an isocyanate resin,
- wherein the respective strands of adjacent layers are oriented substantially perpendicularly to one another;
- wherein two or more of the layers each include a pre-formed board extending across both of a length and a width of the product;
- wherein one or more other layers include two or more parallel pre-formed boards each extending across the width of the product; and
- wherein the strands have an average length of between 145 mm and 300 mm; an average width of between 10 mm and 25 mm; and an average thickness of between 0.5 mm and 1.5 mm.

27. A method according to claim 26, wherein the method includes forming the boards using a continuous strand board forming technique.

28. A method according to claim 26, wherein the method includes forming the strands from hardwood.

29. A method according to claim 28, wherein the method includes forming the strands from logs of eucalypts.

30. A method according to claim 29, wherein the logs are harvested from plantation trees having an age of 12 years or less.

31. A method according to claim 30, wherein the logs are harvested from forest thinnings having an age of 30 years or less.

32. A method according to claim 26, wherein the method includes forming the strands from softwood.

33. A method according to claim 32, wherein the method includes forming the strands from logs of pines.

34. A method according to claim 26, wherein the method includes treating the strands for insects.

35. A method according to claim 26, wherein the method includes sanding the surfaces of each layer.

36. A method according to claim 26, wherein the method includes gluing one surface of each layer to a surface of an adjacent layer to form the laminate.

37. A method according to claim 36, wherein the method includes gluing the layers together using a Poly Urethane Reactive (PUR) glue.

38. A method according to claim 26, wherein the product is formed from five layers.

* * * * *